United States Patent
Zhao

(10) Patent No.: US 10,649,132 B2
(45) Date of Patent: May 12, 2020

(54) DIFFUSION SHEET, BACKLIGHT MODULE AND DISPLAY DEVICE

(71) Applicants: BOE Technology Group Co., Ltd., Beijing (CN); Beijing BOE Special Display Technology Co., Ltd., Beijing (CN)

(72) Inventor: Xing Zhao, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/224,128

(22) Filed: Dec. 18, 2018

(65) Prior Publication Data

US 2019/0219757 A1    Jul. 18, 2019

(30) Foreign Application Priority Data

Jan. 16, 2018   (CN) .......................... 2018 1 0040433

(51) Int. Cl.
*F21V 7/04*   (2006.01)
*F21V 8/00*   (2006.01)
*G02B 5/02*   (2006.01)

(52) U.S. Cl.
CPC .............. *G02B 6/0051* (2013.01); *G02B 5/02* (2013.01); *G02B 6/0063* (2013.01); *G02B 6/0065* (2013.01)

(58) Field of Classification Search
None
See application file for complete search history.

(56) References Cited

U.S. PATENT DOCUMENTS

| 5,781,342 A | * | 7/1998 | Hannon | ..................... C08J 5/18 |
| | | | | 359/599 |
| 6,396,552 B1 | * | 5/2002 | Brandt | .............. G02F 1/133615 |
| | | | | 349/160 |
| 2002/0054250 A1 | * | 5/2002 | Heden | .................. G02B 6/0038 |
| | | | | 349/65 |
| 2004/0136155 A1 | | 7/2004 | Onishi et al. | |

FOREIGN PATENT DOCUMENTS

CN            1499260 A       5/2004

OTHER PUBLICATIONS

Office Action dated Nov. 1, 2019 issued in corresponding Chinese Application No. 201810040433.8.

* cited by examiner

*Primary Examiner* — Vip Patel
(74) *Attorney, Agent, or Firm* — Nath, Goldberg & Meyer; Joshua B. Goldberg

(57) ABSTRACT

A diffusion sheet, a backlight module and a double-sided display device are provided. A transflective layer is provided on one surface of a substrate layer. On one hand, a portion of the light incident from an opposite side of the substrate layer is transmitted to a first display panel via the diffusion sheet; on the other hand, another portion of the light is reflected back to the light guide plate and enters a second display panel on another side of the double-sided backlight module.

17 Claims, 4 Drawing Sheets

DIFFUSION SHEET, BACKLIGHT MODULE AND DISPLAY DEVICE

CROSS-REFERENCE TO RELATED APPLICATIONS

The present application claims the priority of Chinese Patent Application No. 201810040433.8, filed on Jan. 16, 2018 in the Chinese Patent Office, the contents of which are incorporated herein by reference in its entirety.

TECHNICAL FIELD

The present disclosure relates to the technical field of display technology, in particularly, to a diffusion sheet, a backlight module and a display device.

BACKGROUND

If a double-sided display device operates in a high-luminance environment such as under the sunlight, the display panel of the double-sided display device must have very high luminance to ensure a displayed picture to be clear enough to be visible. The double-sided display device typically includes two backlight modules for providing light sources to two liquid crystal display panels, respectively. However, in order to realize thinner products, the backlight modules are simplified into only one backlight module including, for example, a light bar, a light guide plate and two optical film layers. As such, the luminances of the liquid crystal display panels on both sides are substantially the same.

SUMMARY

According to an aspect of the disclosure, a diffusion sheet is provided, the diffusion sheet may include: a substrate layer, including a first surface and a second surface disposed opposite to each other: and a transflective layer, disposed on the first surface. The transflective layer transmits a portion of light incident from the second surface and reflects another portion of the light incident from the second surface.

In an embodiment, the transflective layer may include reflective regions and transmissive regions, and the reflective regions and the transmissive regions are arranged alternately.

In an embodiment, a reflective material is provided on a surface of each of the reflective regions proximal to the substrate layer and/or on a surface of each of the reflective regions distal to the substrate layer, and each of the transmissive regions is made of a light transmissive material.

In an embodiment, each of the reflective regions is made of a reflective material, and each of the transmissive regions is made of a light transmissive material.

In an embodiment, both each of the transmissive regions and each of the reflective regions are made of a transflective material.

In an embodiment, a surface of each of the reflective regions proximal to the substrate layer is a smooth plane; and/or a surface of each of the reflective regions distal to the substrate layer is a smooth plane.

In an embodiment, an arc-shaped recessed structure is provided on a surface of each of the transmissive regions proximal to the substrate layer; and/or an arc-shaped recessed structure is provided on a surface of each of the transmissive regions distal to the substrate layer.

In an embodiment, the arc-shaped recessed structure has a recess on one side or two recesses on two opposite sides of the arc-shaped recessed structure.

In an embodiment, the arc-shaped recessed structure has a maximum recess depth of about 0.02 um to 0.5 um.

In an embodiment, the reflective regions and the transmissive regions are arranged in columns along a width direction of the transflective layer, and columns of reflective regions and columns of transmissive regions are arranged alternately along a length direction of the transflective layer.

In an embodiment, the diffusion sheet further includes a diffusion structure for increasing an emergent angle of light. The diffusion structure is located at the second surface of the substrate layer. The diffusion structure includes a plurality of particles, and each particle has a radius of about 0.001 um to 0.1 um. A surface of each of the particles is subjected to an atomization process.

According to an aspect of the disclosure, a backlight module is provided, the backlight module may include a first diffusion sheet, a light source and a light guide plate. The light source is located on a side of the light guide plate, the first diffusion sheet is located on a light exit surface of the light guide plate, and the first diffusion sheet is the diffusion sheet described above.

In an embodiment, the backlight module may further include a second diffusion sheet. The first diffusion sheet and the second diffusion sheet are located on two light exit surfaces of the light guide plate, respectively.

According to an aspect of the disclosure, a single-sided display device is provided, the single-sided display device may include a first display panel and the backlight module described above. The first display panel is located on a side of the first diffusion sheet distal to the light guide plate.

According to an aspect of the disclosure, a double-sided display device is provided, the double-sided display device may include a first display panel, a second display panel, and the backlight module described above. The backlight module is located between the first display panel and the second display panel; the first display panel is located on a side of the first diffusion sheet distal to the light guide plate; and the second display panel is located on a side of the second diffusion sheet distal to the light guide plate.

According to an aspect of the disclosure, a method for manufacturing the diffusion sheet described above is provided. The method may include: forming the substrate layer; and forming the transflective layer on the first surface of the substrate layer.

In an embodiment, the method may further include forming a diffusion structure on the second surface of the substrate layer. The transflective layer may include reflective regions and transmissive regions that are arranged alternately. A reflective material is provided on a surface of each of the reflective regions proximal to the substrate layer and/or on a surface of each of the reflective regions distal to the substrate layer. Each of the transmissive regions is made of a light transmissive material.

In an embodiment, the transflective layer may include reflective regions and transmissive regions that are arranged alternately; each of the reflective regions is made of a reflective material; and each of the transmissive regions is made of a light transmissive material.

In an embodiment, the transflective layer may include reflective regions and transmissive regions that are arranged alternately. Both each of the reflective regions and each of the transmissive regions are made of a transflective material.

DETAILED DESCRIPTION

The technical solutions of the present disclosure will be clearly and completely described in conjunction with the accompanying drawings. It is obvious that the described embodiments are some embodiments of the present disclosure, but not all of the embodiments of the present disclosure. Other embodiments obtained by those skilled in the art based on the embodiments described herein without creative efforts fall into the scope of the present disclosure.

The inventor of the present disclosure has found that in case that one backlight module is employed to provide light to a double-sided display device, if the luminance in the environment where one display panel is placed is high whereas the luminance in the environment where another display panel is placed is low, and if the display panel operated in the high-luminance environment has appropriate luminance, the display panel operated in the low-luminance environment will have excessively high luminance, thereby bringing about the waste of light energy; on the other hand, if the display panel operated in the low-luminance environment has appropriate luminance, the display panel operated in the high-luminance environment has excessively low luminance, thereby making it difficult to achieve clear display.

Figure 1:
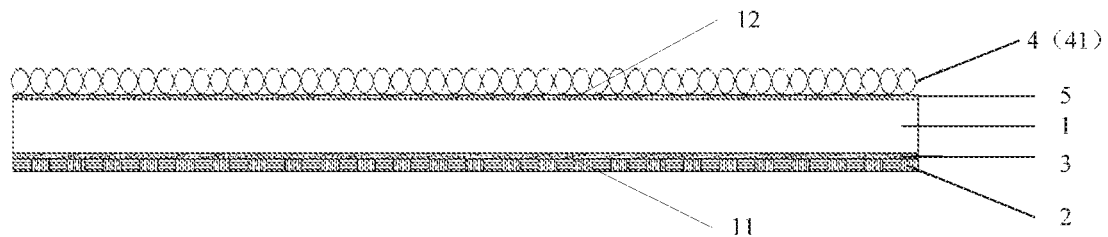
FIG. 1 is a schematic structural view of a diffusion sheet according to an embodiment of the disclosure.

FIG. 1 is a schematic structural view of a diffusion sheet according to an embodiment of the present disclosure. As shown in FIG. 1, the diffusion sheet includes a substrate layer 1 having a first surface 11 and a second surface 12 disposed opposite to each other. In the embodiment of the present disclosure, as shown in FIG. 1, the first surface 11 is a lower surface of the substrate layer 1, and the second surface 12 is an upper surface of the substrate layer 1. The diffusion sheet further includes a transflective layer 2. The transflective layer 2 is disposed on the first surface 11 of the substrate layer 1 and is capable of transmitting a portion of light incident from the second surface 12 and reflecting another portion of the light incident from the second surface 12.

In an embodiment, the substrate layer 1 is made of an organic material, for example, may be made of one or more of polymethylmethaerylate, polycarbonate, polystyrene, and styrene-methyl methacrylate copolymer. The substrate layer 1 may be formed by injection molding. The substrate layer 1 may have a thickness of 25 um to 300 um.

Figure 2:
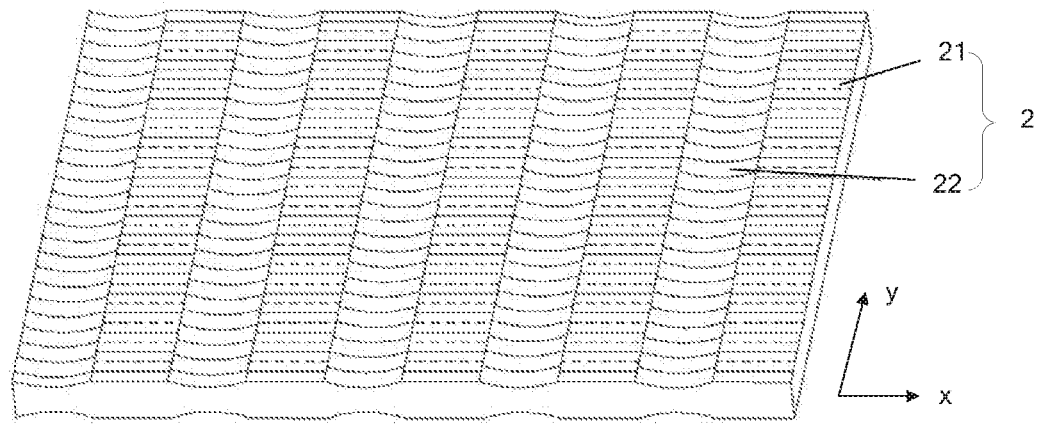
FIG. 2 is a schematic perspective view of a transflective layer according to an embodiment of the disclosure.

FIG. 2 is a schematic perspective view of the transflective layer 2 according to an embodiment of the present disclosure. As shown in FIGS. 1 and 2, the transflective layer 2 includes reflective regions 21 and transmissive regions 22 arranged alternately. In an embodiment, the reflective regions 21 and the transmissive regions 22 are evenly disposed. Specifically, the reflective regions 21 and the transmissive regions 22 are arranged in columns along a width direction (i.e., a y-axis direction) of the transflective layer 2. The lengths of the reflective regions 21 are the same with each other, and the widths of the reflective regions 21 are the same with each other. The lengths of the transmissive regions 22 are the same with each other, and the widths of the transmissive regions 22 are the same with each other. Columns of reflective regions 21 and columns of transmissive regions 22 are arranged alternately along a length direction (i.e., an x-axis direction) of the transflective layer 2.

A reflective material is provided on a surface of each of the reflective regions 21 proximal to the substrate layer 1 and/or on a surface of each of the reflective regions 21 distal to the substrate layer 1. That is, the reflective material is disposed only on the surface(s) of each of the reflective regions 21. Alternatively, the reflective regions 21 may be made of the reflective material. In an embodiment of the present disclosure, the reflective material may include a compound material containing chromium, titanium or niobium.

In an embodiment, the surface of each of the reflective regions 21 proximal to the substrate layer 1 is a smooth plane; and/or the surface of each of the reflective regions 21 distal to the substrate layer 1 is a smooth plane. The surface(s) of the transflective layer 2 is/are formed into smooth plane(s), so that the reflective index of the diffusion sheet can be increased.

Figure 3:
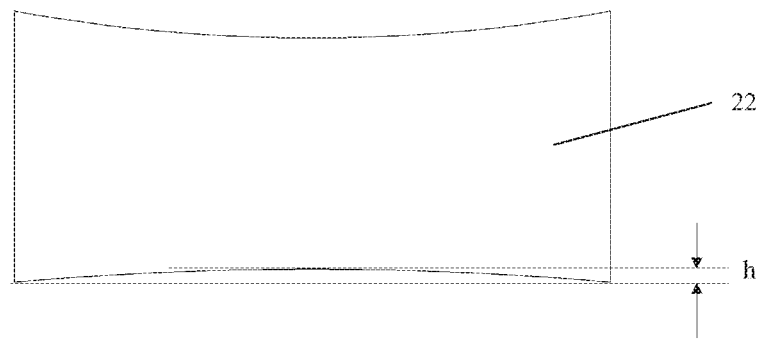
FIG. 3 is a schematic view of a transmissive region in a transflective layer according to an embodiment of the disclosure.

FIG. 3 is a schematic diagram of a transmissive region in the transflective layer 2 according to an embodiment of the present disclosure. As shown in FIGS. 2 and 3, the surface of each of the transmissive regions 22 proximal to the substrate layer 1 is provided with an arc-shaped recess structure thereon, and/or the surface of each of the transmissive regions 22 distal to the substrate layer 1 is provided with an arc-shaped recess structure thereon. Specifically, the recessed structure has a shape of concave lens which may have a recess on one side or two recesses on two opposite sides. The recessed structure has a maximum recess depth of h, for example, h is in a range of about 0.02 um to 0.5 um. Each of the transmissive regions 22 may be made of a light transmissive material having good light transmissive property, for example, a PVC (polyvinyl chloride) material.

As shown in FIG. 2, a plurality of reflection regions 21 and a plurality of transmissive regions 22 are arranged alternately along the length direction (i.e., the x-axis direction) of the transflective layer 2. Each of the reflective regions 21 may be made of the reflective material, and each of the transmissive regions 22 may be made of the light transmissive material having good light transmissive property, so that the transflective layer 2 can uniformly reflect and transmit light, thereby ensuring uniform luminance of a display panel.

It should be noted that the material of the transmissive regions 22 may be selected to be the same as the material of the reflective regions 21. For example, each of the transmissive regions 22 and each of the reflective regions 21 are both made of a same transflective material, such that the transflective layer 2 can be formed integrally, thereby simplifying the manufacturing process thereof.

Further, as shown in FIG. 1, the diffusion sheet further includes a first adhesive layer 3 located between the first surface 11 of the substrate layer 1 and the transflective layer 2. The transflective layer 2 is configured to adhere the first surface 11 of the substrate layer 1 with the first adhesive layer 3.

Further, as shown in FIG. 1, the diffusion sheet further includes a diffusion structure 4 located on the second surface 12 of the substrate layer 1 for increasing an emergent angle of the light, so as to increase a viewing angle of the display device. The diffusion structure 4 includes a plurality of fine particles 41. The sizes and shapes of the particles 41 may be the same or different. Each of the particles 41 may have a circular shape, a semicircular shape, an elliptical shape, or the like, and the size of each of the particles 41 may be in a range of about 0.001 um to 0.1 um. The particles 41 can be arranged in an array or randomly.

In an embodiment, the surface of each particle 41 is atomized so as to further increase the emergent angle of the light.

Further, as shown in FIG. 1, the diffusion sheet further includes a second adhesive layer 5 located between the diffusion structure 4 and the second surface 12 of the substrate layer 1. The second adhesive layer 5 is configured to adhere the second surface 12 of the substrate layer 1 with the diffusion structure 4.

The first adhesive layer 3 and the second adhesive layer 5 may be conventional adhesives, and may be one or more of epoxy resin, acrylic resin, polyurethane, and polyvinyl acetate. In an embodiment, in order to realize less light loss, the first adhesive layer 3 and/or the second adhesive layer 5 has/have a refractive index of about 1 to 1.5, and the first adhesive layer 3 and/or the second adhesive 5 has/have a thickness of about 0.5 μm to 2.5 μm.

Figure 4A:
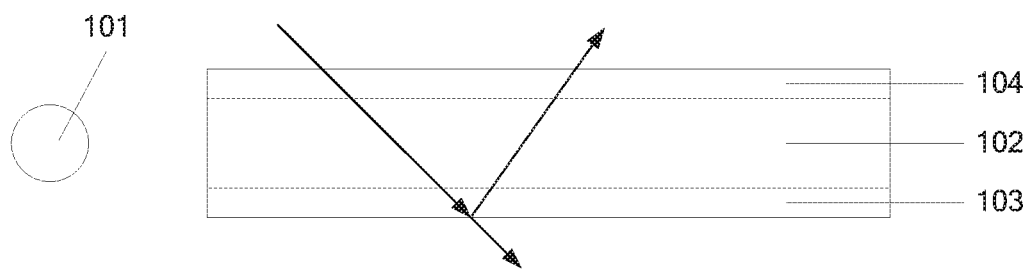
FIG. 4a is a schematic structural view of a backlight module according to an embodiment of the disclosure.
Figure 4B:
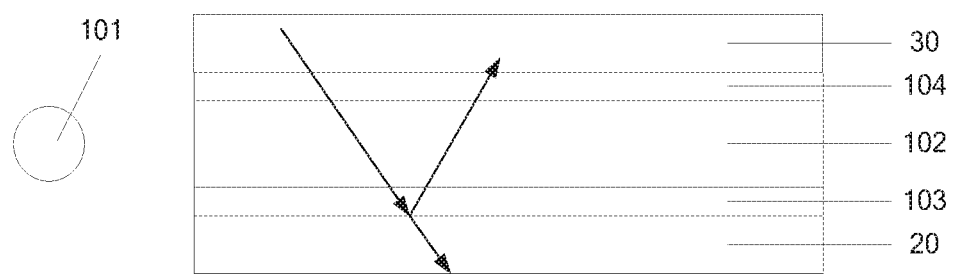
FIG. 4b is a schematic structural view of a double-sided display device according to an embodiment of the disclosure.

FIG. 4a is a schematic structural view of a double-sided backlight module according to an embodiment of the present disclosure; and FIG. 4b is a schematic structural view of a double-sided display device according to an embodiment of the present disclosure. As shown in FIG. 4a, the double-sided backlight module includes a first diffusion sheet 103, a second diffusion sheet 104, a light source 101, and a light guide plate 102. As shown in FIG. 4b, the double-sided display device includes a first display panel 20, a second display panel 30, and a double-sided backlight module according to the embodiment of the present disclosure.

The first diffusion sheet 103 is the diffusion sheet according to the embodiment of the present disclosure, and the second diffusion sheet 104 is a conventional diffusion sheet instead of the diffusion sheet of the embodiment of the present disclosure. The light source 101 is located on a side of the first diffusion sheet 103 and the second diffusion sheet 104, and the light guide plate 102 is located between the first diffusion sheet 103 and the second diffusion sheet 104. The light source 101 is located at a side of the light guide plate 102. The upper and lower surfaces of the light guide plate 102 are light exit surfaces. The first diffusion sheet 103 and the second diffusion sheet 104 are located on opposite sides of the light guide plate 102, respectively, i.e., on the two light exit surfaces of the light guide plate 102.

It should be noted that the diffusion structure of the first diffusion sheet 103 according to the embodiment of the present disclosure is attached to the light guide plate 102.

The diffusion sheet (i.e., the first diffusion sheet 103) according to the embodiment of the present disclosure is provided on one surface of the double-sided backlight module. The transflective layer 2 is provided on one surface of the substrate layer 1 of the diffusion sheet 103 (i.e., one surface of the diffusion sheet 103 distal to the light guide plate 102). On one hand, a portion of the light incident from one surface (i.e., the second surface 12) of the substrate layer 1 is transmitted to the first display panel 20 via the diffusion sheet; on the other hand, another portion of the light is reflected back to the light guide plate 102 and enters the second display panel 30 on the other side of the double-sided backlight module. Thus, in case of double-sided display, the light reflectivity of the diffusion sheet (for example, the first diffusion sheet 103) on one surface of the double-sided backlight module is improved.

Since a portion of the light entering the diffusion sheet is reflected back to the light guide plate 102 and enters the second display panel 30, such that the light intensity of the second display panel 30 can be compensated by the portion of the light. Therefore, the intensity of the light incident on the second display panel 30 is greater than the intensity of the light incident on the first display panel 20, thereby making the luminance of the second display panel 30 is greater than the luminance of the first display panel 20. If the ambient luminance of the first display panel 20 is lower that the ambient luminance of the second display panel 30, both the first display panel 20 and the second display panel 30 can clearly display pictures under corresponding ambient luminances, so as to achieve optimal display effect and reasonable and effective use of light energy.

FIG. 4b is a schematic structural view of a double-sided display device according to an embodiment of the present disclosure. As shown in FIG. 4b, the double-sided display device includes a first display panel 20, a second display panel 30, and the double-sided backlight module as described above. The double-sided backlight module is located between the first display panel 20 and the second display panel 30. The first display panel 20 is located on a side of the first diffusion sheet 103 distal to the light guide plate 102, and the second display panel 30 is located on a side of the second diffusion sheet 104 distal to the light guide plate 102.

It should be noted that, when the double-sided display device is in use, the ambient luminance of the first display panel 20 is less than the ambient luminance of the second display panel 30. Specifically, the first display panel 20 faces a relatively dark environment, for example, in an indoor environment, and the second display panel 30 faces a relatively bright environment, for example, in an outdoor environment.

In the double-sided display device according to the embodiments of the disclosure, the transflective layer 2 is provided on one surface of the substrate layer 1 of the diffusion sheet 103 (i.e., one surface of the diffusion sheet 103 distal to the light guide plate 102). On one hand, a portion of the light incident from one surface (i.e., the second surface 12) of the substrate layer 1 is transmitted to the first display panel 20 via the first diffusion sheet 103; on the other hand, another portion of the light is reflected back to the light guide plate 102 and enters the second display panel 30 on the other side of the double-sided display device. Thus, in case of double-sided display, the light reflectivity of the first diffusion sheet 103 is improved.

Since a portion of the light entering the first diffusion sheet 103 is reflected back to the light guide plate 102 and enters the second display panel 30, such that the light intensity of the second display panel 30 can be compensated by the portion of the light. Therefore, the intensity of the light incident on the second display panel 30 is greater than the intensity of the light incident on the first display panel 20, thereby making the luminance of the second display panel 30 is greater than the luminance of the first display panel 20. If the ambient luminance of the first display panel 20 is lower that the ambient luminance of the second display panel 30, both the first display panel 20 and the second display panel 30 can clearly display pictures under corresponding ambient luminances, so as to achieve optimal display effect and reasonable and effective use of light energy.

It should be noted that the diffusion sheet can also be applied to a single-sided display device having a single-sided backlight module.

Figure 5A:
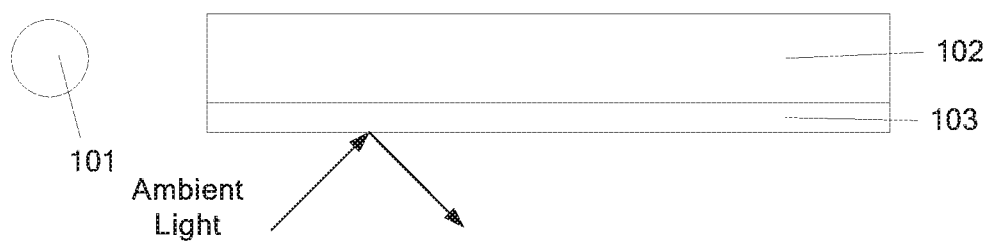
FIG. 5a is a schematic structural diagram of a backlight module according to an embodiment of disclosure.
Figure 5B:
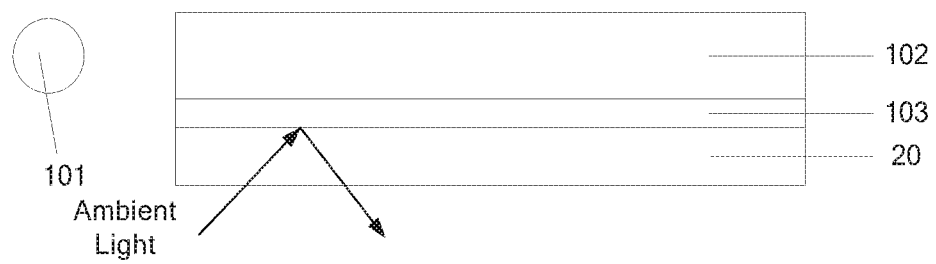
FIG. 5b is a schematic structural diagram of a single-sided display device according to an embodiment of the disclosure.

FIG. 5a is a schematic structural view of a single-sided backlight module according to an embodiment of the present disclosure; and FIG. 5b is a schematic structural view of a single-sided display device according to an embodiment of the present disclosure.

As shown in FIG. 5a, the single-sided backlight module includes a first diffusion sheet 103, a light source 101, and a light guide plate 102. As shown in FIG. 5b, the single-sided display device includes a first display panel 20 and the single-sided backlight module according to the embodiment of the present disclosure.

The first diffusion sheet 103 is the diffusion sheet according to the embodiment of the present disclosure. The light guide plate 102 is located on one surface of the first diffusion sheet 103. The light source 101 is located on a side of the light guide plate 102. One surface of the light guide plate 102 is a light exit surface, and the first diffusion sheet 103 is located on the light exit surface of the light guide plate 102.

It should be noted that the diffusion structure of the first diffusion sheet 103 according to the embodiment of the present disclosure is attached to the light guide plate 102.

The first diffusion sheet 103 according to the embodiment of the present disclosure is provided on one surface of the single-sided backlight module. The transflective layer 2 is provided on one surface of the substrate layer 1 of the first diffusion sheet 103 (i.e., one surface of the first diffusion sheet 103 distal to the light guide plate 102). On one hand, when the ambient light is incident onto the transflective layer 2 of the first diffusion sheet 103, a portion of the light is transmitted to the light guide plate 102 via the first diffusion sheet 103; on the other hand, as shown in FIG. 5a, when the ambient light is incident onto the first diffusion sheet 103, another portion of the light is reflected back to the first display panel 20 by the first diffusion sheet 103.

Since another portion of the light entering the first diffusion sheet 103 is reflected back to the first display panel 20, such that the light intensity of the first display panel 20 can be compensated by the portion of the light. When the single-sided display device operates in a high-luminance environment, the transflective layer 2 of the first diffusion sheet 103 may reflect a portion of the ambient light, and the portion of the ambient light can compensate the backlight of the single-sided display device, so that the luminance of the single-sided display device can be improved.

FIG. 5b is a schematic structural diagram of a single-sided display device according to an embodiment of the present disclosure. As shown in FIG. 5b, the single-sided display device includes a first display panel 20 and the single-sided backlight module as described above. The single-sided backlight module is located on one surface of the first display panel 20, and the first display panel 20 is located on a surface of the first diffusion sheet 103 distal to the light guide plate 102.

In the singe-sided display device according to the embodiments of the disclosure, the transflective layer 2 is provided on one surface of the substrate layer 1 of the first diffusion sheet 103 (i.e., one surface of the first diffusion sheet 103 distal to the light guide plate 102). On one hand, when the ambient light is incident onto the transflective layer 2 of the first diffusion sheet 103, a portion of the light is transmitted to the light guide plate 102 and enters the light guide plate 102; on the other hand, as shown in FIG. 5b, when the ambient light is incident onto the first diffusion sheet 103, another portion of the light is reflected back to the first display panel 20 by the first diffusion sheet 103.

Since another portion of the light entering the first diffusion sheet 103 is reflected back to the first display panel 20, such that the light intensity of the first display panel 20 can be compensated by the portion of the light. When the single-sided display device operates in a high-luminance environment, the transflective layer 2 of the first diffusion sheet 103 may reflect a portion of the ambient light, and the portion of the ambient light can compensate the backlight of the single-sided display device, so that the luminance of the single-sided display device can be improved.

Figure 6:
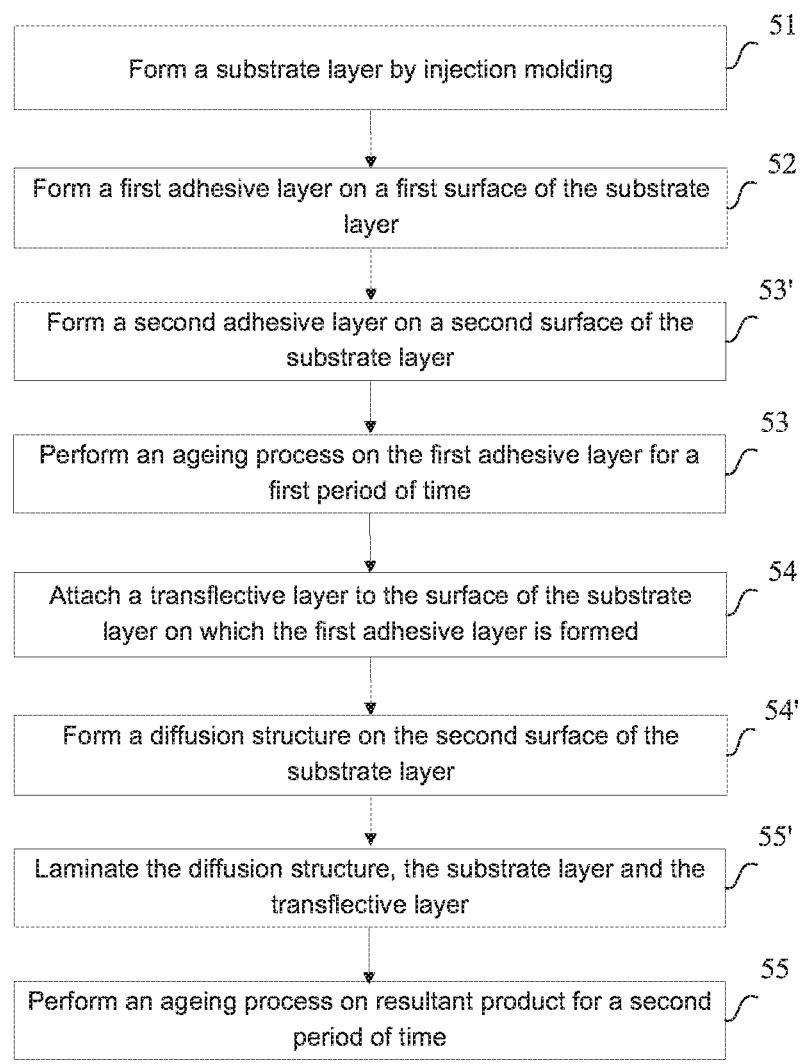
FIG. 6 is a flow chart of a method for manufacturing a diffusion sheet according to an embodiment of the disclosure.

FIG. 6 is a flow chart of a method of manufacturing a diffusion sheet according to an embodiment of the present disclosure. Referring to FIGS. 1, 2, 4a, 4b and 6, the method may include the following steps 51, 52, 53, 54 and 55.

Step 51, a substrate layer 1 is formed by injection molding.

Specifically, the material of the substrate layer 1 may includes an organic material, such as one or more of polyrnethylmethacrylate, polycarbonate, polystyrene, and styrene-methyl methacrylate copolymer. The substrate layer 1 may be formed by injection molding with a thickness of about 25 um to 300 um.

Step 52, a first adhesive layer 3 is formed on a first surface 11 of the substrate layer 1.

Specifically, the material of the first adhesive layer 3 is sprayed on the first surface 11 of the substrate layer 1. The first adhesive layer 3 may be a conventional adhesive, and may be one or more of epoxy resin, acrylic resin, polyurethane and polyvinyl acetate. In an embodiment, in order to realize less light loss, the first adhesive layer 3 may have a refractive index in a range of 1 to 1.5, and the first adhesive layer 3 may have a thickness of about 0.5 μm to 2.5 μm.

Step 53, an ageing process is performed on the first adhesive layer 3 for a first period of time.

Specifically, an ageing process is performed on the first adhesive layer 3 for a first period of time, for example 1-30 minutes, in a stove.

Step 54, a transflective layer 2 is attached to a surface of the substrate layer 1 on which the first adhesive layer 3 is formed.

It should be noted that, the transflective layer is prepared in advance before step 54. As shown in FIGS. 2 and 3, the transflective layer 2 includes reflective regions 21 and transmissive regions 22. The reflective regions 21 and the transmissive regions 22 are arranged alternately.

A reflective material is provided on a surface of each of the reflective regions 21 proximal to the substrate layer 1 and/or on a surface of each of the reflective regions 21 distal to the substrate layer 1. Alternatively, each of the reflective regions is made of a reflective material. The surface of each of the reflective regions 21 proximal to the substrate layer 1 and/or the surface of each of the reflective regions 21 distal to the substrate layer 1 is/are smooth plane(s).

An arc-shaped recessed structure is provided on a surface of each transmissive region 22 proximal to the substrate layer 1 and/or on a surface of each transmissive region 22 distal to the substrate layer 1. The recessed structure has a maximum recess depth of h, for example, h is in a range of about 0.02 um to 0.5 um. The material of each of the transmissive regions 22 may also be a reflective material. In an embodiment, the transmissive regions 22 and the reflective regions 21 are both made of the same material, such that the transflective layer 2 can be formed integrally, thereby simplifying the manufacturing process thereof.

The reflective regions 21 and the transmissive regions 22 are evenly disposed, so that the transflective layer 2 can uniformly reflect and transmit light, thereby ensuring uniform luminance of a display panel.

Step 55, an ageing process is performed on the resultant product for a second period of time.

Specifically, the second period of time is longer than the firstperiod of time, for example, the second period of time is 3 hours to 40 hours.

It can be seen from steps 51 to 55 that, according to the method for manufacturing the diffusion sheet according to the embodiment of the disclosure, the transflective layer 2 is provided on one surface (i.e., the first surface 11) of the substrate layer 1. On one hand, a portion of the light incident from one surface (i.e., the second surface 12) of the substrate layer 1 is transmitted to a first display panel via the first diffusion sheet 103; on the other hand, another portion of the light is reflected back to a light guide plate 102 and enters a second display panel on the other side of the display device. Thus, in case of double-sided display, the light reflectivity of the diffusion sheet on one side of the display device is improved.

Since a portion of the light entering the diffusion sheet is reflected back to the light guide plate and enters the second display panel, such that the light intensity of the second display panel can be compensated by the portion of the light. Therefore, the intensity of the light incident on the second display panel is greater than the intensity of the light incident on the first display panel, thereby making the luminance of the second display panel is greater than the luminance of the first display panel. If the ambient luminance of the first display panel is lower that the ambient luminance of the second display panel, both the first display panel and the second display panel can clearly display pictures under corresponding ambient luminances, so as to achieve optimal display effect and reasonable and effective use of light energy. Furthermore, the manufacturing process of the diffusion sheet is simple and easy to be implemented.

Further, in order to further increase the diffusion effect of the diffusion sheet on the light, a diffusion structure may be further formed on the diffusion sheet. Specifically, before or after the first adhesive layer 3 is formed on the first surface 11 of the substrate layer 1 (i.e., step 52) and before the ageing process is performed on the first adhesive layer for a first period of time (i.e., step 53), the method may also include the following step 53'.

Step 53', a second adhesive layer 5 is formed on a second surface 12 of the substrate layer 1.

Specifically, the material of the second adhesive layer 5 is sprayed on the second surface 12 of the substrate layer 1. The second adhesive layer 3 may be a conventional adhesive, and may be one or more of epoxy resin, acrylic resin, polyurethane and polyvinyl acetate. In an embodiment, in order to realize less light loss, the second adhesive layer 5 may have a refractive index in a range of 1 to 1.5, and the second adhesive layer 5 may have a thickness of about 0.5 μm to 2.5 μm.

In the embodiment of the present disclosure, the step 52 is performed first, and then the step 53' is performed. However, the execution order of the step 52 and the step 53' is not limited thereto.

Further, before or after the transflective layer 2 is formed on the surface of the substrate layer 1 on which the first adhesive layer 3 is formed (i.e., step 54) and before the ageing process is performed on the resultant product for a second period of time (i.e., step 55), the method may further includes the following step 54'.

Step 54', a diffusion structure 4 is formed on the second surface 12 of the substrate layer 1.

Specifically, the diffusion structure 4 is used for increasing an emergent angle of the light, so as to increase a viewing angle of the display device. The diffusion structure 4 includes a plurality of fine particles 41. The sizes and shapes of the particles 41 may be the same or different. Each of the particles may have a circular shape, a semicircular shape, an elliptical shape, or the like, and the size of each of the particles 41 may be in a range of about 0.001 um to 0.1 um. The particles 41 can be arranged in an array or randomly. In an embodiment, the surface of each particle 41 is atomized so as to further increase the emergent angle of the light.

In the embodiment of the present disclosure, the step 54 is performed first, and then the step 54' is performed. However, the execution order of the step 54 and the step 54' is not limited thereto.

Further, in order to ensure the fixedness between various layers of the diffusion sheet, after the transflective layer 2 is attached to the surface of the substrate layer 1 on which the first adhesive layer 3 is formed (i.e., step 54), after the diffusion structure is formed on the second surface 12 of the substrate layer 1 (i.e., step 54'), and before the ageing process is performed on the resultant product for the second period of time (i.e., step 55), the method may further includes the following step 55'.

Step 55', the diffusion structure 4, the substrate layer 1 and the transflective layer 2 are laminated.

Specifically, the diffusion structure 4, the substrate layer 1 and the transflective layer 2 are laminated with a composite shaft, the resultant product is wound up, and then the ageing process is performed on the resultant product.

In the diffusion sheet and manufacturing method thereof, the backlight module and the display device according to the present disclosure, fine diffusion particles are sprayed on the upper surface of the substrate layer 1 so as to form the diffusion structure 4, and the transflective layer 2 including the reflective regions 21 and the transmissive regions 22 is attached to the lower surface of the substrate layer 1, so that both transmission and reflection of the light can be realized, thereby compensating for the light on one side of the light guide plate and achieving reasonable distribution of light intensity on both sides of the diffusion sheet. The double-sided display device of the present disclosure can still achieve an optimal display effect in a high-luminance environment such as under the sunlight.

It should be understood that the above implementations are merely exemplary embodiments for the purpose of illustrating the principles of the present disclosure, however, the present disclosure is not limited thereto. It will be apparent to those skilled in the art that various changes and modifications can be made without departing from the spirit and essence of the present disclosure, which are also to be regarded as falling within the scope of the present disclosure.

What is claimed is:
1. A diffusion sheet, comprising:
 a substrate layer, comprising a first surface and a second surface disposed opposite to each other; and
 a transflective layer, disposed on the first surface;

wherein the transflective layer transmits a portion of light incident from the second surface and reflects another portion of the light incident from the second surface, the transflective layer comprises reflective regions and transmissive regions, and the reflective regions and the transmissive regions being arranged alternately, an arc-shaped recessed structure is provided on a surface of each of the transmissive regions proximal to the substrate layer; and an arc-shaped recessed structure is provided on a surface of each of the transmissive regions distal to the substrate layer.

2. The diffusion sheet according to claim 1, wherein
a reflective material is provided on a surface of each of the reflective regions proximal to the substrate layer and/or on a surface of each of the reflective regions distal to the substrate layer, and
each of the transmissive regions is made of a light transmissive material.

3. The diffusion sheet according to claim 2, wherein
a surface of each of the reflective regions proximal to the substrate layer is a smooth plane; and/or
a surface of each of the reflective regions distal to the substrate layer is a smooth plane.

4. The diffusion sheet according to claim 1, wherein
each of the reflective regions is made of a reflective material, and
each of the transmissive regions is made of a light transmissive material.

5. The diffusion sheet according to claim 1, wherein
each of the transmissive regions and each of the reflective regions are both made of a transflective material.

6. The diffusion sheet according to claim 1, wherein the arc-shaped recessed structure has two recesses on two opposite sides of the arc-shaped recessed structure.

7. The diffusion sheet according to claim 1, wherein the arc-shaped recessed structure has a maximum recess depth of about 0.02 um to 0.5 um.

8. The diffusion sheet according to claim 1, wherein
the reflective regions and the transmissive regions are arranged in columns along a width direction of the transflective layer, and
columns of reflective regions and columns of transmissive regions are arranged alternately along a length direction of the transflective layer.

9. The diffusion sheet according to claim 1, further comprising a diffusion structure for increasing an emergent angle of light, wherein
the diffusion structure is located at the second surface of the substrate layer;
the diffusion structure comprises a plurality of particles, and each particle has a radius of about 0.001 um to 0.1 um; and
a surface of each of the particles is subjected to an atomization process.

10. A backlight module, comprising a first diffusion sheet, a light source and a light guide plate, wherein
the light source is located on a side of the light guide plate,
the first diffusion sheet is located on a light exit surface of the light guide plate, and
the first diffusion sheet is the diffusion sheet according to claim 1.

11. The backlight module according to claim 10, further comprising a second diffusion sheet, wherein
the first diffusion sheet and the second diffusion sheet are located on two light exit surfaces of the light guide plate, respectively.

12. A single-sided display device, comprising a first display panel and the backlight module according to claim 10, wherein
the first display panel is located on a side of the first diffusion sheet distal to the light guide plate.

13. A double-sided display device, comprising a first display panel, a second display panel, and the backlight module according to claim 11, wherein
the backlight module is located between the first display panel and the second display panel;
the first display panel is located on a side of the first diffusion sheet distal to the light guide plate; and
the second display panel is located on a side of the second diffusion sheet distal to the light guide plate.

14. A method of manufacturing the diffusion sheet according to claim 1, the method comprising:
forming the substrate layer; and
forming the transflective layer on the first surface of the substrate layer.

15. The method according to claim 14, further comprising forming a diffusion structure on the second surface of the substrate layer, wherein
a reflective material is provided on a surface of each of the reflective regions proximal to the substrate layer and/or on a surface of each of the reflective regions distal to the substrate layer; and
each of the transmissive regions is made of a light transmissive material.

16. The method according to claim 14, wherein
each of the reflective regions is made of a reflective material; and
each of the transmissive regions is made of a light transmissive material.

17. The method according to claim 14, wherein
each of the reflective regions and each of the transmissive regions are both made of a transflective material.

* * * * *